United States Patent
Aziz et al.

(10) Patent No.: US 8,537,885 B2
(45) Date of Patent: Sep. 17, 2013

(54) LOW-POWER DOWN-SAMPLED FLOATING TAP DECISION FEEDBACK EQUALIZATION

(75) Inventors: Pervez Aziz, Dallas, TX (US); Hiroshi Kimura, San Jose, CA (US); Amaresh Malipatil, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 1 day.

(21) Appl. No.: 13/410,735

(22) Filed: Mar. 2, 2012

(65) Prior Publication Data

US 2013/0039407 A1 Feb. 14, 2013

Related U.S. Application Data

(60) Provisional application No. 61/522,711, filed on Aug. 12, 2011.

(51) Int. Cl.
*H03H 7/30* (2006.01)

(52) U.S. Cl.
USPC ........... 375/233; 375/226; 375/229; 375/230; 375/232; 375/234; 375/316; 375/346; 375/350; 455/63.1; 455/67.13; 455/114.2; 455/296; 455/501; 370/335; 370/342; 333/18; 333/28 R; 708/300; 327/551

(58) Field of Classification Search
USPC ................. 375/226, 229, 230, 232, 233, 234, 375/316, 346, 350; 455/63.1, 67.13, 114.2, 455/296, 501; 370/335, 342; 333/18, 28 R; 708/300; 327/551
See application file for complete search history.

(56) References Cited

U.S. PATENT DOCUMENTS

2009/0016422 A1* 1/2009 Zhong et al. .................. 375/233

* cited by examiner

*Primary Examiner* — Leon Flores

(57) ABSTRACT

In described embodiments, a variety of down-sampling techniques are employed to generate a more constrained set of floating-tap positions when compared to floating-tap Decision Feedback Equalization (DFE) architectures that allow unconstrained 1T resolution or separated floating-tap positions. Down-sampling is employed to constrain the floating-tap positions rather than positions occurring with 1T resolution or spacing. Two broad down-sampling techniques, phase pruning and phase amalgamation, are applied to a variety of exemplary DFE implementations. Although the tap positions are more constrained, the architectures select floating-tap positions containing dominant reflection inter-symbol interference (ISI) terms.

21 Claims, 12 Drawing Sheets

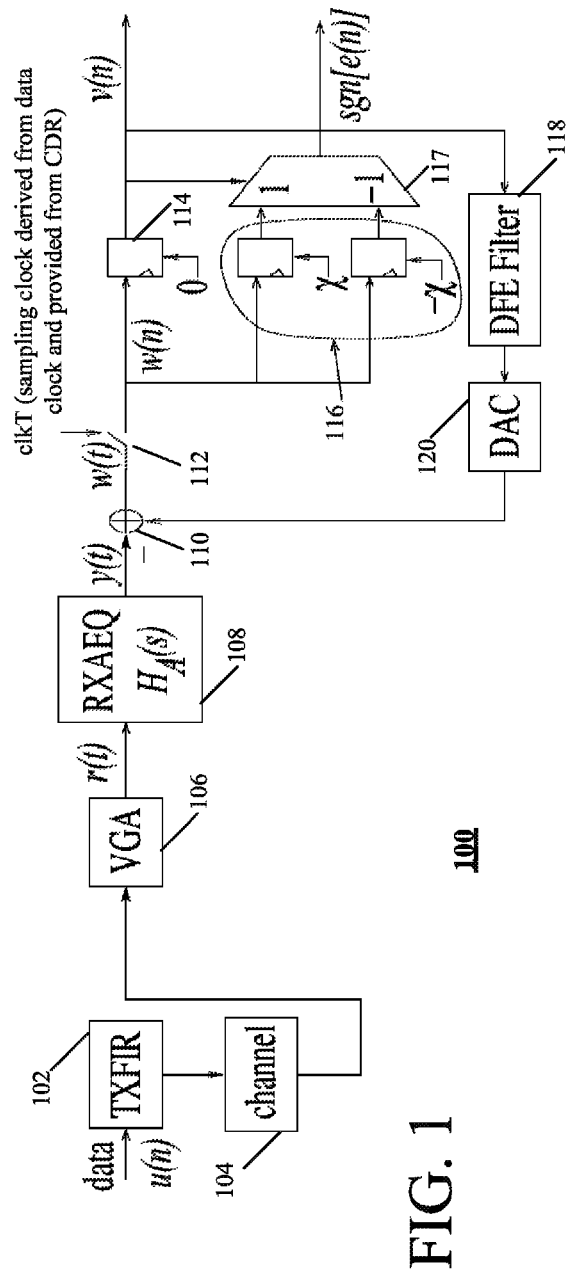
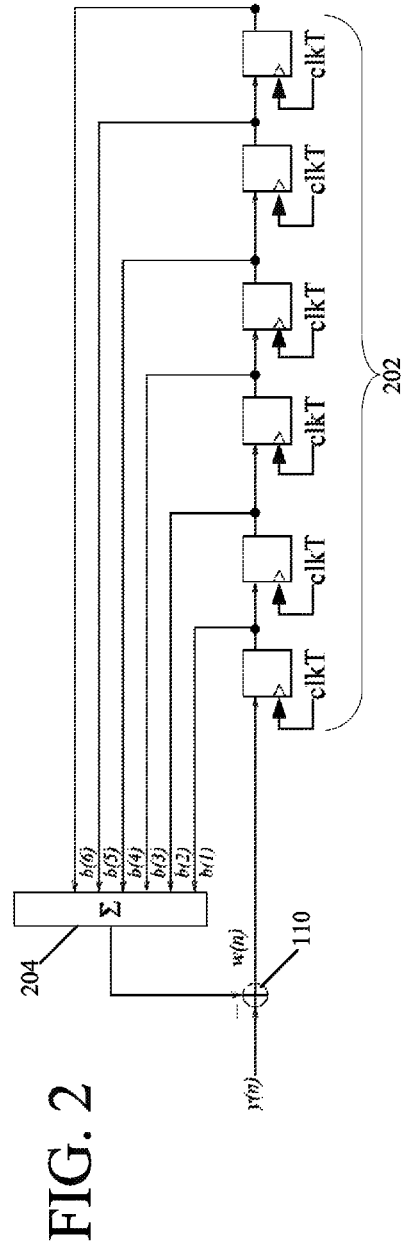
FIG. 1
FIG. 2

LOW-POWER DOWN-SAMPLED FLOATING TAP DECISION FEEDBACK EQUALIZATION

CROSS-REFERENCE TO RELATED APPLICATIONS

This application claims the benefit of the filing date of U.S. provisional application No. 61/522,711, filed on Aug. 12, 2011, the teachings of which are incorporated herein by reference.

BACKGROUND OF THE INVENTION

In many data communication applications, serializer and de-serializer (SerDes) devices facilitate the transmission of parallel data between two points across a serial link. Data at one point is converted from parallel data to serial data and transmitted through a communications channel to the second point where it received and converted from serial data to parallel data.

At high data rates frequency-dependent signal loss from the communications channel (the signal path between the two end points of a serial link), as well as signal dispersion and distortion, can occur. Ideally, without noise, jitter, and other loss and dispersion effects, a data eye at the receiver will exhibit a relatively ideal shape. In practice, the shape of the data eye changes with noise, jitter, other loss and dispersion effects, and temperature and voltage variations. As such, the communications channel, whether wired, optical, or wireless, acts as a filter and might be modeled in the frequency domain with a transfer function. Correction for frequency dependent losses of the communications channel, and other forms of signal degradation, often requires signal equalization at a receiver of the signal.

Equalization through use of one or more equalizers compensates for the signal degradation to improve communication quality. Equalization may also be employed at the transmit side to pre-condition the signal. Equalization, a form of filtering, generally requires some estimate of the transfer function of the channel to set its filter parameters. However, in many cases, the specific frequency-dependent signal degradation characteristics of a communications channel are unknown, and often vary with time. In such cases, an equalizer with adaptive setting of parameters providing sufficient adjustable range might be employed to mitigate the signal degradation of the signal transmitted through the communications channel. Equalization might be through a front end equalizer, a feedback equalizer, or some combination of both. The shape of the data eye also changes due to equalization applied to input signal of the receiver. In some systems, equalization applied by a transmitter's equalizer further alters the shape of the eye from the ideal.

If a simple, analog front-end equalizer (AFE) is employed, the data eye operating margin improves. However, better performance might be achieved through use of a Decision Feedback Equalizer (DFE) in combination with an AFE. Classical DFE equalization optimizes for an ISI and opens up the vertical and horizontal data eye opening. DFE filters play an important role in SerDes communication channels. The DFE filtering is employed to cancel post-cursor inter symbol interference (ISI) in the equalized channel's pulse response. The output of a DFE filter is subtracted from an input signal; The DFE filter includes a number of taps, which number determines how well the post-cursor ISI might be cancelled. The longer the filter length (i.e., the more filter taps), the more ISI terms might be cancelled, but at the expense of increasing DFE filter length complexity and power consumption of a given implementation.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention allows for applying decision feedback equalization to an input signal. A set of delays receives the input signal, the set of delays comprising a fixed-tap group and a floating tap group, wherein delays of the fixed-tap group are coupled in series, and wherein each delay holds a detected symbol of the input signal with a period based on the symbol period. Multiplexing logic couples predetermined outputs of the set of delays of the fixed-tap group to selected ones of the floating tap group and provide the output values of the selected ones of the floating tap group based on a relative best phase criteria to provide at least one of phase pruning and phase amalgamation. A combiner i) adjusts an output value of one or more of the fixed-tap group and the output values of the selected ones of the floating tap group by a corresponding tap-weight coefficient and ii) combines the tap-weight coefficient adjusted values into an output signal, wherein the output signal of the combiner is subtracted from the input signal.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 1 shows a high level block diagram of a Serdes communication channel employing transmit equalization, receive (RX) analog equalization (AEQ) as well as DFE equalization to detect data bits v(n);

FIG. 2 shows a block diagram of a 6 tap DEE filter implementation;

DETAILED DESCRIPTION

Figure 3:
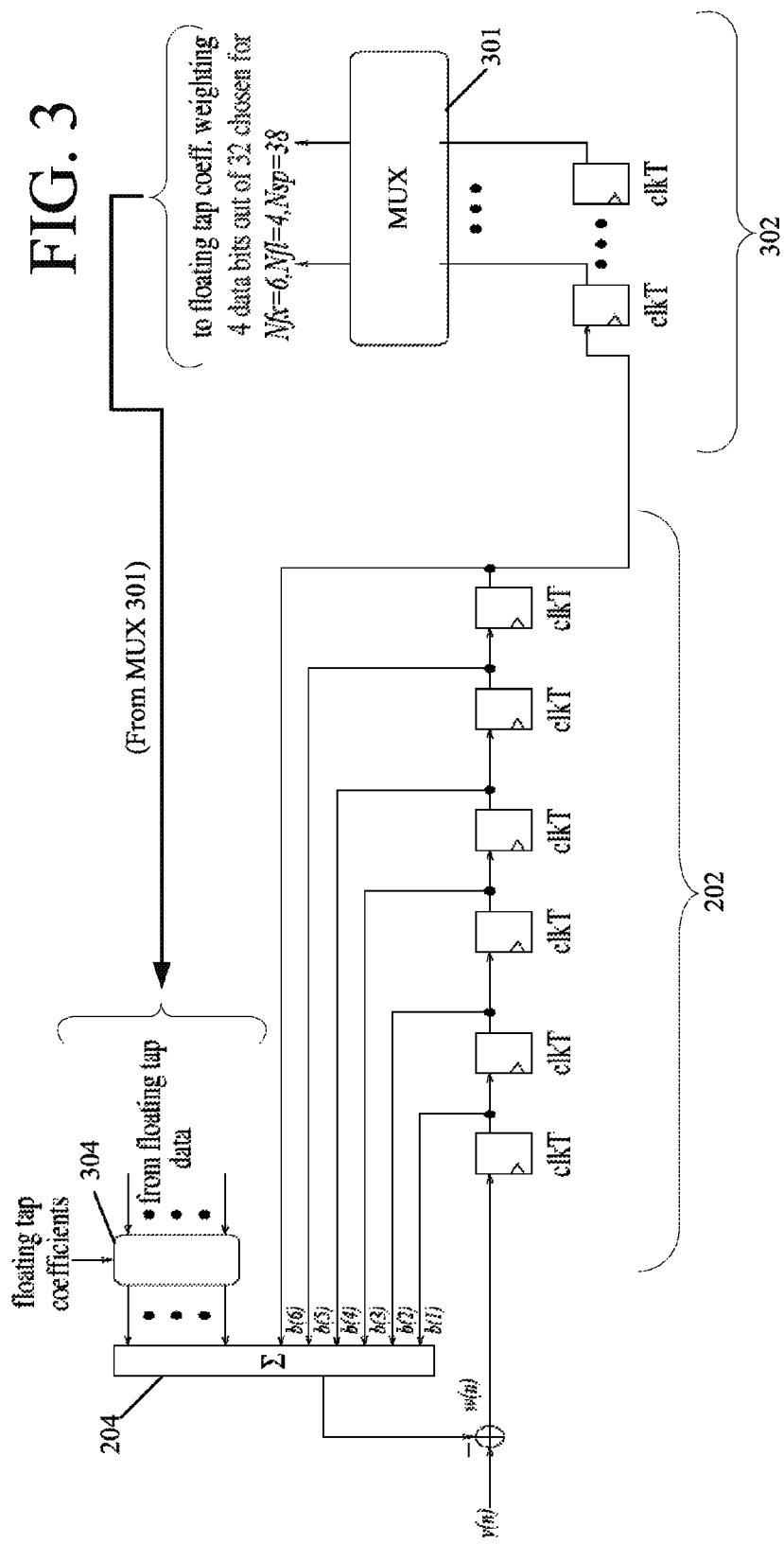
FIG. 3 shows a block diagram of a floating-tap DFE architecture with 6 fixed taps and 4 floating taps configured for positions up to 38T

In accordance with exemplary embodiments of the present invention, a variety of down-sampling techniques within a Decision Feedback Equalizer (DFE) are employed to generate a more constrained set of floating-tap positions when compared to floating-tap DFE architectures that allow unconstrained 1T resolution or separated floating-tap positions. This more constrained set of floating-tap positions might yield a better performance versus power tradeoff for a given implementation. Down-sampling is employed to constrain the floating-tap positions rather than with positions occurring with 1T resolution or spacing. Two broad down-sampling techniques, phase pruning and phase amalgamation, are described and subsequently applied to a variety of exemplary DFE implementations. Although the tap positions are more constrained, the architectures select floating-tap positions containing dominant reflection inter-symbol interference (ISI) terms.

Embodiments of the present invention employing these down-sampling techniques might provide for the following advantages while achieving a floating-tap DFE architecture with constrained taps. Implementations might require fewer circuit elements (e.g., latches or delays) and/or employ lower clock rates for circuit elements, providing for a reduction in power consumption. Implementations might also cancel relatively large post-cursor ISI terms with the constrained floating taps whether or not smaller terms are cancelled.

FIG. 1 shows a high level block diagram 100 of a SerDes communication channel employing transmit equalization (TXFIR) 102 applied to user data bits u(n), receive (RX) analog equalization (AEQ) 108 applied to the received signal r(t) from channel 104, and DFE equalization through DFE filter 118 to detect data bits v(n), where DFE equalization might be improved with one or more embodiments of the present invention. The received signal r(t) from channel 104 might first be gain adjusted by variable gain amplifier (VGA) 106 before RXAEQ 108 applies filter transfer function $H_A(s)$ to the received signal r(t). After the output of DFE filter 118 is converted to an analog signal by digital-to-analog converter (DAC) 120, the result is subtracted from an input signal y(t) in combiner 110 to provide w(t). Clock/data recovery (CDR) provides a sampling signal to sampler 112 to generate samples w(n) from w(t) with only one data clock, clkT, but might also make use of a bang-bang type phase detector (BBPD) which would use a transition clock that half a baud period (T/2) phase offset from the data clock.

The equalized samples w(t) are then provided to decision device 114, which might be a latch or slicer, that generates data decisions v(n) corresponding to the input samples based on a threshold. As shown, data decisions v(n) are sliced in a slicer to generate "1" or "−1" depending on the comparison. Since equalization opens up the vertical and horizontal data eye opening, FIG. 1 also shows additional slicers 116 and multiplexor (MUX) 117 that are used to sample the data eye and generate an error value sign (sgn[e(n)]) corresponding to the sampling error e(n) for, for example, the CDR circuitry to adjust sampling phase, as well as for possible adaptation of equalizer parameters and taps.

FIG. 2 shows a block diagram of a 6 tap DFE filter implementation. The 6 tap DFE filter comprises 6 series-coupled latches (or flip-flops) 202, and has 6 coefficients b(1) through b(6) with which the latch outputs are weighted before the weighted outputs are combined in summing node 204. The output of summing node 204 is used to subtract the overall DFE output from the input signal y(n) (in the sampling domain, or if in the analog domain from y(t) by applying the output of summing node 204 to DAC 120).

Returning to FIG. 1, since the decision process exhibits a practical delay of 1T, in practice, the first decision that is produced is v(n-1), relative to the input signal y(n) and time n. This DFE architecture of FIG. 1 is an example of a 'fixed' tap architecture having 6 fixed DFE taps. If the number of DFE taps increases for a given architecture to, for example, a span of 38 taps to cancel ISI terms at higher tap locations, such as positions 36, 37, 38, then a 38-tap DFE filter having 38 latches and corresponding coefficients might be required. The latches are clocked at the symbol or baud rate period "T" as indicated in the figures by signal clkT.

However, floating-tap DFE filters offer a method to efficiently cancel reflection based ISI at higher taps by allowing the taps to 'float' (i.e., take on only certain positions where they provide relatively best performance). A full latch structure of up to 38 latches is still required. However, if a design desires to cover only a few reflections at high tap positions, only those taps are used at the desired selected positions. Such an adaptive, floating-tap DFE is described in U.S. Patent Application Publication No. US 2009/0016422, filed Jul. 13, 2007, published Jan. 15, 2009, entitled "SYSTEM FOR AN ADAPTIVE FLOATING TAP DECISION FEEDBACK EQUALIZER", commonly owned by the assignee of the present invention, and the teachings of which are incorporated herein in their entirety by reference.

FIG. 3 shows a block diagram of floating-tap DFE architecture based on the fixed tap architecture shown in FIG. 2 with 6 fixed taps 202 and 4 floating taps selected from 32 taps. Therefore, the floating-tap DFE architecture of FIG. 3 is configured for positions up to 38T. MUX 301 receives the output of each of the chain of latches 302 (also clocked at period clkT) and selects the outputs of the four floating taps. The outputs of the four floating taps from MUX 301 are weighted in weighting circuitry 304 and then provided to combiner 204.

For FIG. 3, the following notation might be employed: Nfx is defined as the number of fixed taps; Nsp is the floating-tap span, and Nfl is defined as the number of floating taps. The DFE equalized sampled signal w(n) is as given in relation (1):

$$w(n)=y(n)-\Sigma_{l=1}^{Nfx}b(l)v(n-l)-\Sigma_{l=l_1,\ldots,l_{Nfl}}b(l)v(n-l) \quad (1)$$

In the exemplary embodiment of FIG. 3, Nfx=6, Nsp=38, and, for example, Nfl is set to 4 (i.e., 4 floating taps are employed). In this case, (Nsp-Nfx) latches are employed for the floating-tap section 302, which for the example of FIG. 3 is (38−6)=32 latches. Since the first 6 taps might be fixed, then tap positions beyond the $6^{th}$ tap might be selected as floating taps, and, thus, the 4 floating taps might be selected from a total of 32 floating-tap positions (i.e., positions 7 through 38). Floating-tap positions $l_i$ are unconstrained and might span from i=(Nfx+1) to (Nsp) with 1T resolution. Each of Nfl floating taps might be selected from as many as (Nsp-Nfx) positions. The above relation (1) for a DFE architecture shows sampled signals y(n) and w(n) for simplicity. In practice, y(t) is typically a continuous time signal (sampled to provide as y(n) as in FIG. 1), and the continuous time DFE equalized signal is w(t). For this continuous time signal case, w(n) is the sampled signal. Sampling of continuous time signals might be incorporated into the comparator clocking of the first latch in the DFE structure.

Although the floating-tap DFE architecture described with respect to FIG. 3 performs adequately, the floating-tap DFE architecture requires many latches as well as the corresponding circuits to pick latch data bits corresponding to 4 of 32 floating-tap positions. Therefore, a particular implementation of the floating-tap DFE architecture of FIG. 3 might consume considerable power, occupy relatively large area of an integrated circuit (IC) or system on chip (SoC) solution, and increased circuit complexity with corresponding signal timing/delay factors.

Figure 4:
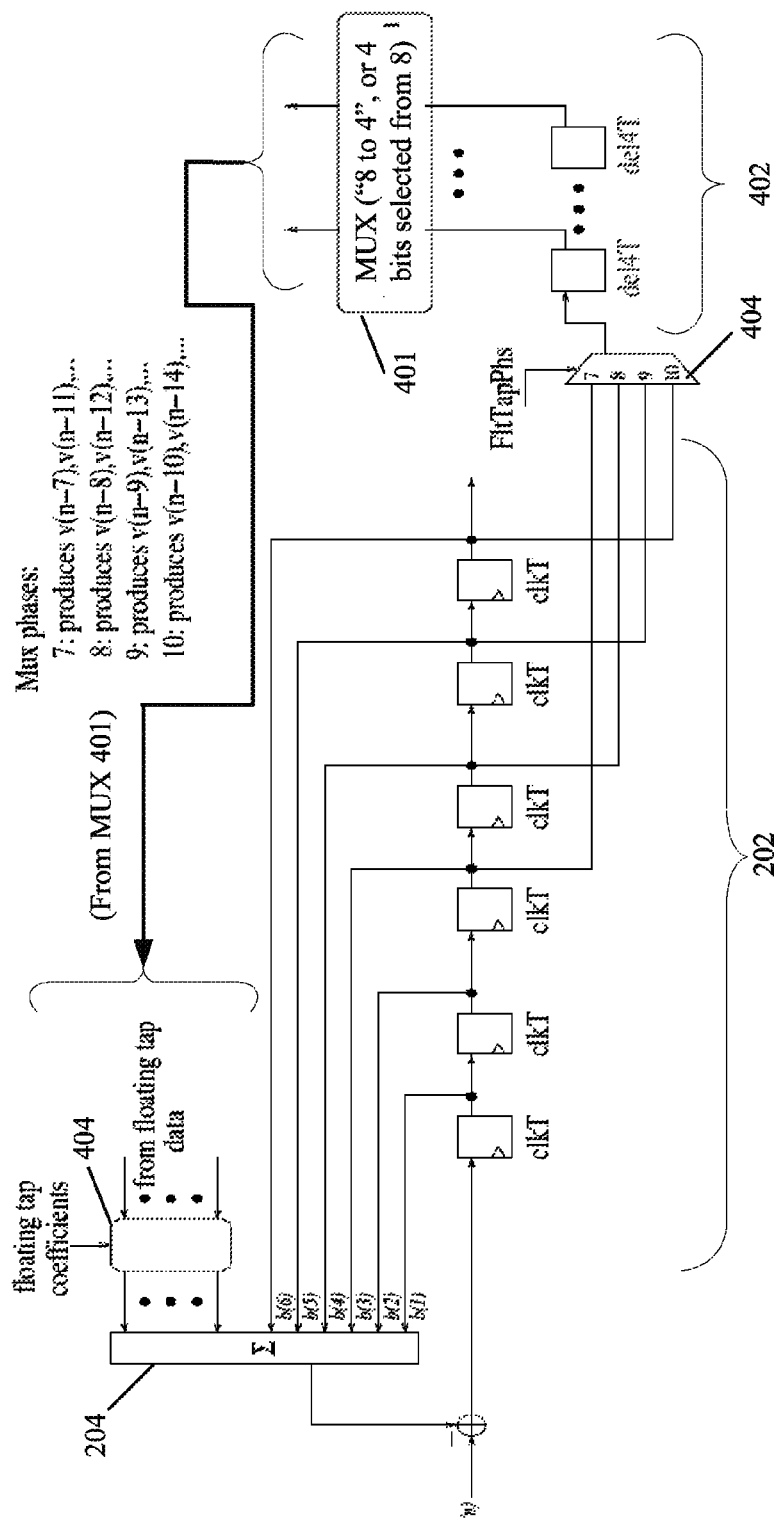
FIG. 4 shows a first exemplary embodiment of the present invention having a phase pruning, down-sampled, floating-tap DFE architecture with i) 6 fixed taps and ii) 4 floating taps which can take positions up to 38T.

FIG. 4 shows a first exemplary embodiment of the present invention having a phase pruning, down-sampled, floating-tap DFE architecture with i) 6 fixed taps 202 and ii) 4 floating taps which can take positions up to 38T. In the first exemplary embodiment, only down-sampled floating-tap positions are considered by a down-sampling factor of NpT. Floating taps from a group of taps, implemented as delays 402 as in FIG. 4, are spaced at down-sampled NpT intervals using analog delays with delay NpT (del4T in the figure) (e.g., Np=4 and 4T delay total). Fewer delays or latches are employed in the first exemplary embodiment to cover a given total floating-tap interval than in the floating-tap DFE architecture of FIG. 3. Data is multiplexed by MUX 404 (under control of external signal FltTapPhs) from fixed tap section 202 through 4T delay structure 402. Outputs from delays 402 are applied to MUX 401 to realize different floating-tap positions at the down-sampled interval, which are then weighted in weighting circuitry 404 before application to combiner 204.

For the first exemplary embodiment shown in FIG. 4, only 8 delays are employed in the floating-tap section (in comparison to the 32 latches of the floating-tap DFE architecture of FIG. 3) and these 8 delays are provide a 4T delay period. Both reduced delay (or latch) count and lower speed of operation of the first exemplary embodiment lead to lower power consumption than the floating-tap DFE architecture of FIG. 3. Moreover, instead of selecting 4 data bits out of 32 positions as in the floating-tap DFE architecture of FIG. 3, this architecture of FIG. 4 selects only 4 data bits out of 8 positions, leading to lower complexity and power consumption. A floating-tap position search process for the architecture of the first exemplary embodiment shown in FIG. 4 is shown in FIG. 5 and is described as follows considering Nfl=4 floating taps.

At step 501, MUX 401 selects input phase 7; tap values at floating-tap positions 7, 11, 15, 19, 23, 27, 31, 35 (8 total positions across a span of 38) are adapted and stored; and the 4 best (maximum tap magnitude) positions out of the above 8 positions are recorded. At step 502, MUX 401 selects input phase 8; tap values at floating-tap positions 8, 12, 16, 20, 24, 28, 32, 36 (8 total positions across a span of 38) are adapted and stored; and the 4 best (maximum tap magnitude) positions out of the above 8 positions are recorded. At step 503, MUX 401 selects input phase 9; tap values at floating-tap positions 9, 13, 17, 21, 25, 29, 33, 37 (8 total positions across a span of 38) are adapted and stored; and the 4 best (maximum tap magnitude) positions out of the above 8 positions are recorded. At step 504, MUX 401 selects input phase 10; tap values at floating-tap positions 10, 14, 18, 22, 26, 30, 34, 38 (8 total positions across a span of 38) are adapted and stored; and the 4 best (maximum tap magnitude) positions out of the above 8 positions are recorded.

At step 505, the phases are pruned by choosing the relative 'optimum' phase as the best one of the phases and 4 floating-tap positions are retained relative to this optimum phase. Phase pruning operates as follows. The relative best 4 (of 8) tap positions from each phase as recorded in steps 501 through 504 are recorded. The phases are pruned and the best phase selected by application of an appropriate criteria. Exemplary criteria include: (i) choose phase with max sum absolute values of the 4 taps; and (ii) choose phase with largest magnitude tap if sum magnitude of other 3 taps is within top two among the 4 phases. Other criteria might be employed as well. At step 506, the phase of MUX 401 is set to relative optimum best phase based on, for example, the phase pruning choice for live traffic data.

Figure 5:
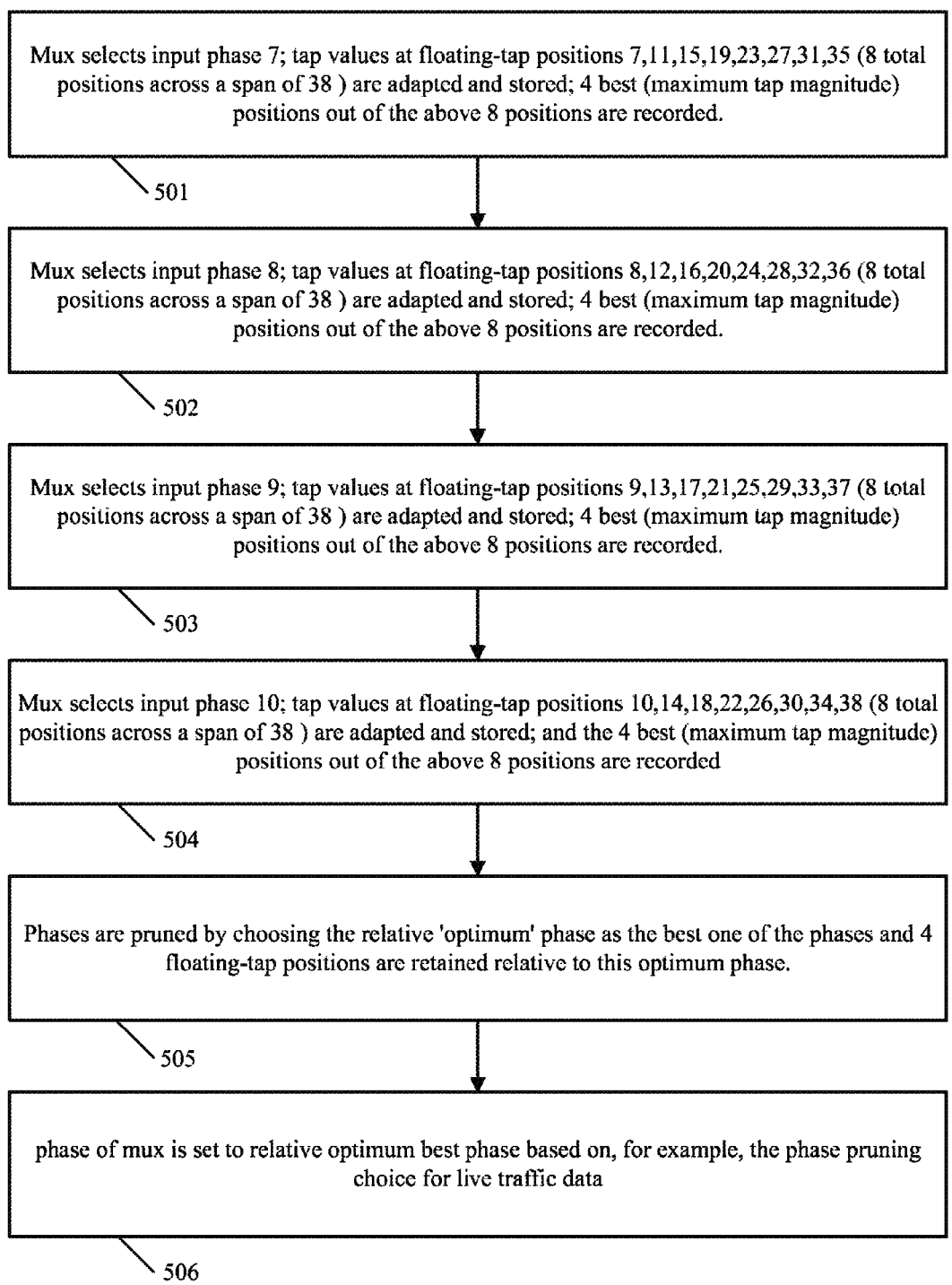
FIG. 5 shows a method in accordance with the first exemplary embodiment as might be employed by the DFE architecture of FIG. 4.

For clarity of description, steps 501, 502, 503, and 504 of FIG. 5 refer to the adaptation and recording of 8 tap values at a time. The exemplary implementations described herein consider 4 floating taps. Thus, each of the above steps might be broken up into two sub-steps such that during each sub-step 4 taps would be adapted and their values recorded. For example step, 501 might comprise two sub-steps: step 501(a) and step 501(b). During step 501(a), taps at floating tap positions 7, 11, 15, 19 might be adapted and their values recorded. During step 501(b), taps at floating tap positions 23, 27, 31, 35 might be adapted and their values recorded. After step 501(b) completes, 4 taps out of the best of these 8 would be selected as described above for step 501 of FIG. 5. Steps 502, 503, and 504 might be similarly described in further detail with respect to these sub-steps.

Figure 6:
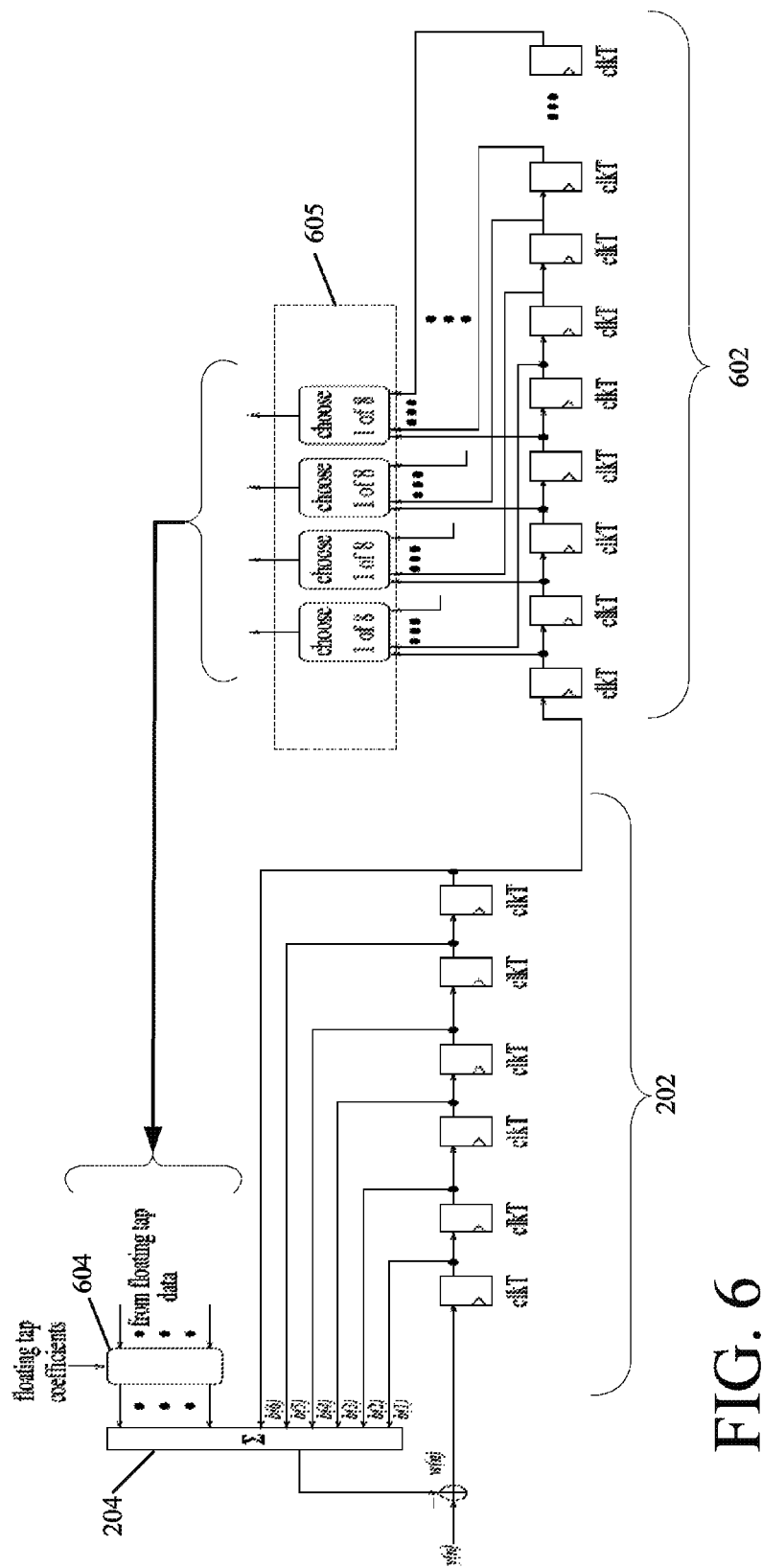
FIG. 6 shows a second exemplary embodiment of the present invention having a phase amalgamation, down-sampled floating-tap DFE architecture with 6 fixed taps and 4 floating taps which might take positions up to 38T.

FIG. 6 shows a second exemplary embodiment of the present invention having a phase amalgamation, down-sampled floating-tap DFE architecture with 6 fixed taps and 4 floating taps which might take positions up to 38T. In phase pruning-based down-sampling, the final DFE tap positions are spaced at NpT intervals but all occur on one particular phase. Phase amalgamation uses a different method of down-sampling for constraining the floating-tap positions. Instead of down-sampling tap positions by a factor of NpT and pruning to one phase by choosing the best of Np phases as previously described, a relative optimum or "best of" one tap is selected on each of the Np phases. These best taps from the multiple phases are amalgamated and retained as final floating-tap positions. As shown in FIG. 6, this DFE architecture includes i) 6 fixed taps 202 and ii) 4 floating taps which can take positions up to 38T selected from latch section 602. Data is multiplexed by MUX Bank 605 from fixed tap section 202 through latch section 602. Outputs from latches 602 are grouped to selected ones of 4 MUX sections (each MUX section corresponds to each of the Np phases) within MUX Bank 605 to realize different floating-tap positions at the down-sampled interval, which are then weighted in weighting circuitry 604 before application to combiner 204.

Figure 7:
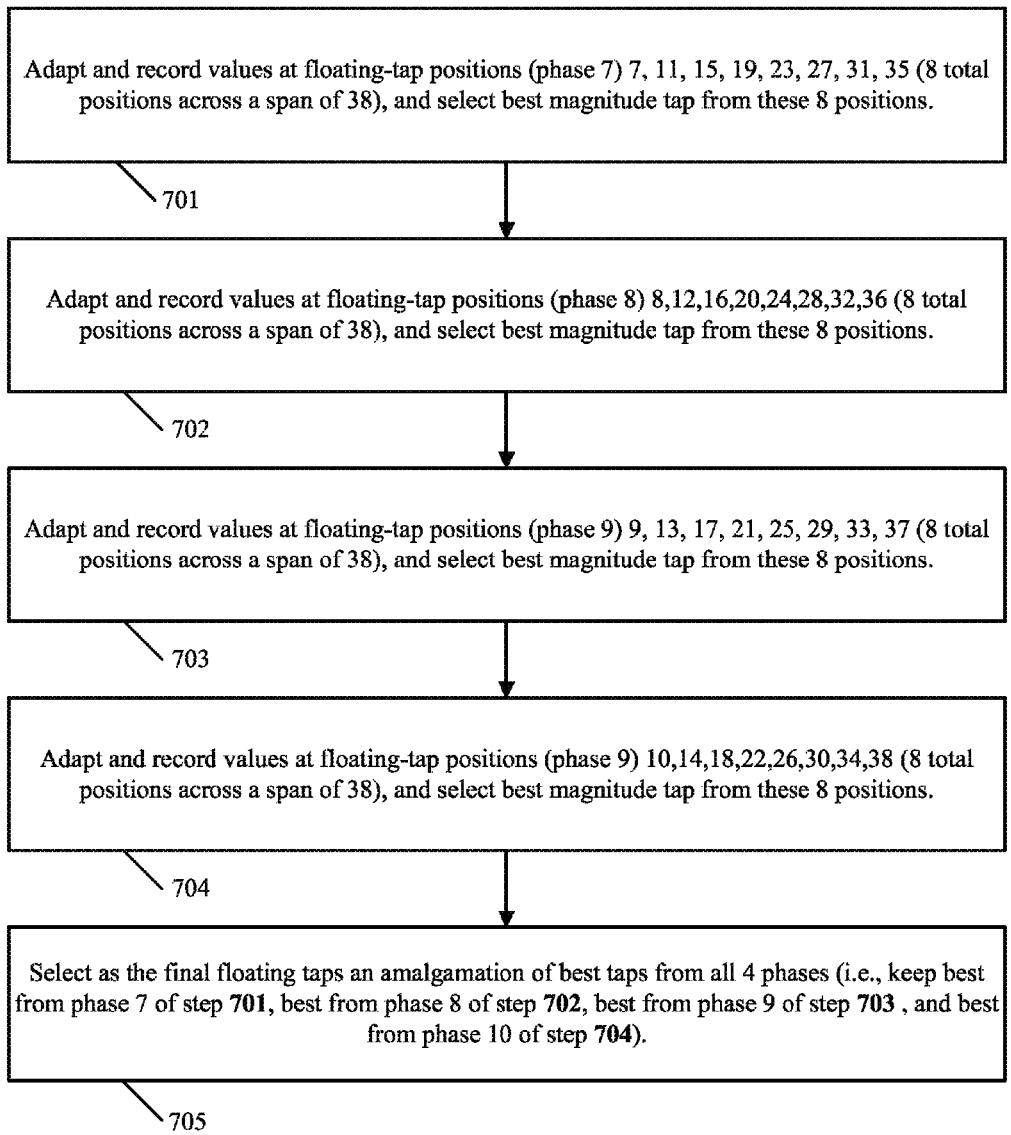
FIG. 7 shows a method in accordance with the secondary exemplary embodiment as might be employed by the DFE architecture of FIG. 6.

FIG. 7 shows a method in accordance with the secondary exemplary embodiment as might be employed by the DFE architecture of FIG. 6. At step 701, adapt and record values at floating-tap positions (phase 7) 7, 11, 15, 19, 23, 27, 31, 35 (8 total positions across a span of 38), and select best magnitude tap from these 8 positions. At step 702, adapt and record values at floating-tap positions (phase 8) 8, 12, 16, 20, 24, 28, 32, 36 (8 total positions across a span of 38), and select best magnitude tap from these 8 positions. At step 703, adapt and record values at floating-tap positions (phase 9) 9, 13, 17, 21, 25, 29, 33, 37 (8 total positions across a span of 38), and select best magnitude tap from these 8 positions. At step 704, adapt and record values at floating-tap positions (phase 9) 10, 14, 18, 22, 26, 30, 34, 38 (8 total positions across a span of 38), and select best magnitude tap from these 8 positions. At step 705, select as the final floating taps an amalgamation of best taps from all 4 phases (i.e., keep best from phase 7 of step 701, best from phase 8 of step 702, best from phase 9 of step 703, and best from phase 10 of step 704).

In a manner analogous to that described above for sub-steps for FIG. 5, steps 701, 702, 703, and 704 in FIG. 7 might be further broken into two sub-steps, each sub-step such that each of the sub-steps processes only 4 taps at a time for our exemplary implementation employing 4 floating taps Since data is available from adjacent phases, live DFE data traffic might be 1T spaced, and, thus, latches are desirably present at all positions with 1T resolution and clocked accordingly. The described implementation of the second exemplary embodiment requires 32 latches clocked at the full clock rate with period T (i.e., clkT).

Figure 8:
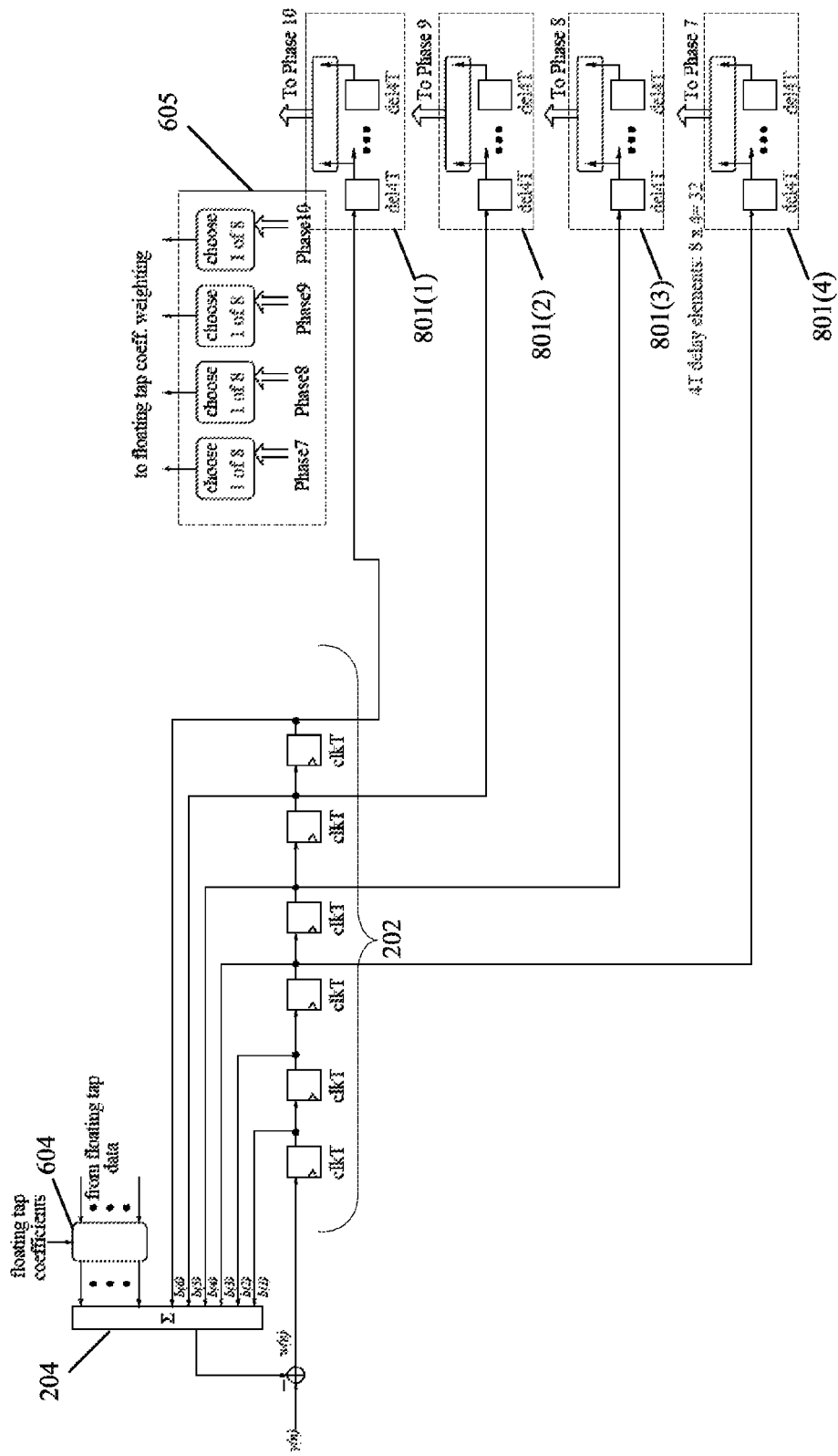
FIG. 8 shows a third exemplary embodiment of the present invention having a simplified phase amalgamation down-sampled floating-tap DFE architecture with 6 fixed taps and 4 floating taps which can take positions up to 38T.

Some simplification of the phase amalgamation architecture as shown in FIGS. 6 and 7 might be achieved as follows. FIG. 8 shows a third exemplary embodiment of the present invention having a simplified phase amalgamation down-sampled floating-tap DFE architecture of FIG. 6 with 6 fixed taps 202 and 4 floating taps. The exemplary embodiment of FIG. 8 is shown using 4 sets of delay elements 801(1) through 801(4) spaced 4T apart (del4T), rather than latches clocked at clkT,. Although the delay count of this third exemplary embodiment is not reduced by a relatively large number, delays in the floating-tap section can operate with lower power (at delay del4T) and, thus, require relatively lower power consumption for a given implementation when compared to the second exemplary embodiment of FIG. 6.

Implementations of the third exemplary embodiment might employ a set of initial delays/latches generating v(n-7); 17(n-8); v(n-9); and v(n-10) operating at 1T rate corresponding with initial phases 7, 8, 9, 10. The method according to FIG. 7 for the second exemplary embodiment might be modified as follows. Subsequent data might be tapped from these initial phases and delayed/clocked at 4T to produce data needed for that phase. Phase 7, with v(n-7), might generate v(n-11); v(n-15); v(n-19); v(n-23); v(n-27); v(n-31); and v(n-35). Phase 8, with v(n-8), might generate v(n-12); v(n-16); v(n-20); v(n-24); v(n-28); v(n-31); and v(n-36). Phase 9, with v(n-9), might generate v(n-13); v(n-16); v(n-21); v(n-25); v(n-29); v(n-30); and v(n-37). Phase 10, with v(n-10), might generate v(n-14); v(n-17); v(n-22); v(n-26); v(n-30); v(n-30); and v(n-38).

The remaining steps of the method for the third exemplary embodiment of FIG. 8 are analogous to that described above with respect to FIG. 7. Implementations of the third exemplary embodiment might employ fewer delays/latches than original phase amalgamation shown in FIG. 6, but still employ relatively more operations than phase pruning. Multiplexing the values for v(n-7); v(n-8); v(n-9); and v(n-10) through one set of 4T delays might only be performed during the floating-tap search phase of the above method. For live data traffic, this configuration might require substantially all of the 4T delays to be present during the processing of live data traffic. Thus, this simplified phase amalgamation method for the third exemplary embodiment of FIG. 8, employs 32 delays in the floating-tap section, but the delay elements can operate with lower power than 1T latches.

The first, second and third embodiments of the present invention have been described for a 1T architecture where the basic DFE architecture includes feedback of all taps and operates the fixed tap portion of the DFB architecture at 1T clock rate (i.e., at the baud or symbol rate). These embodiments might be extended as described subsequently for feedback of less than all taps (or, an "unrolled" tap configuration where a tap is not fed back) and at clock rates differing from the 1T architecture.

Figure 9:
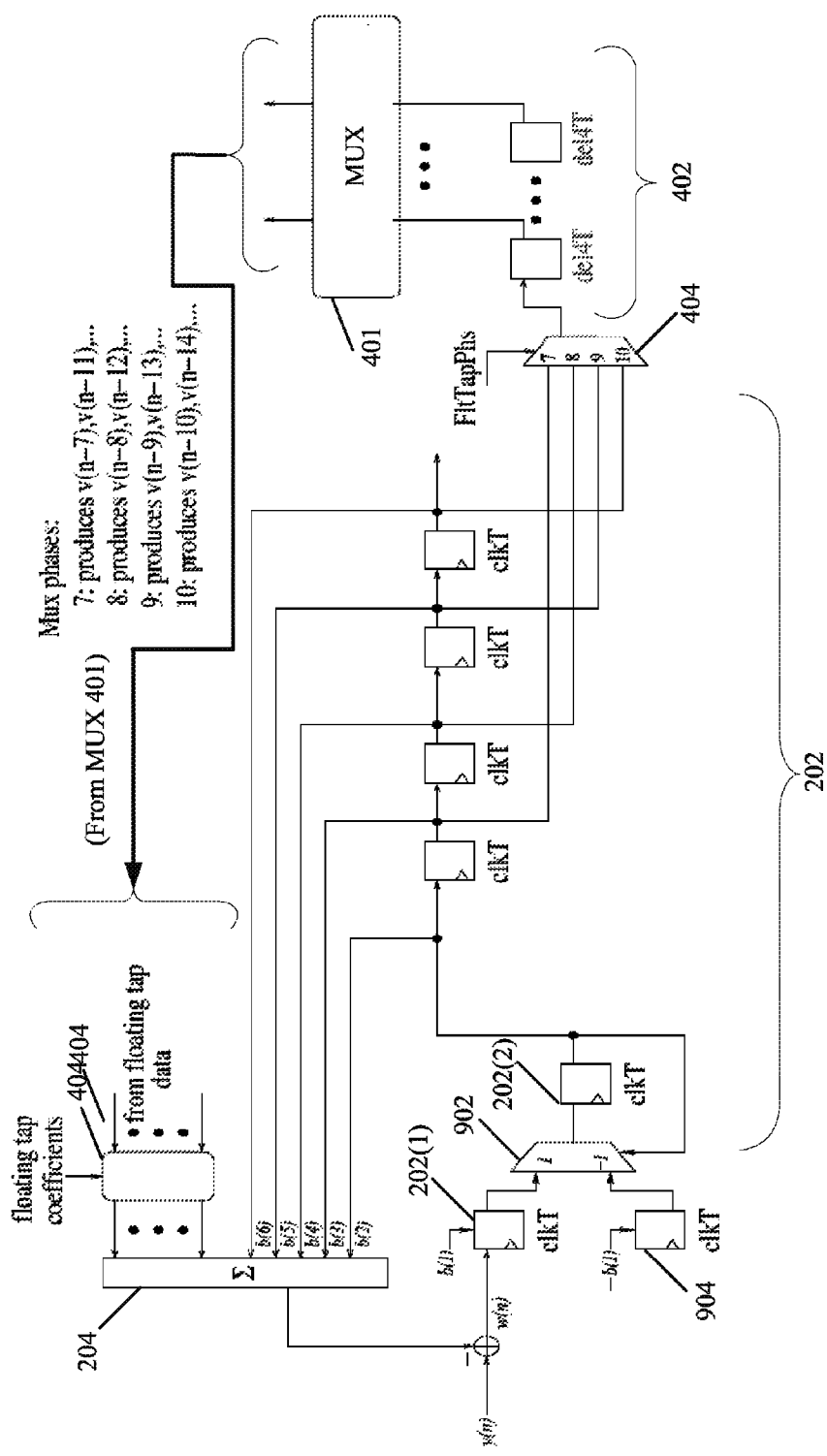
FIG. 9 shows a fourth embodiment of the present invention having a phase pruning, down-sampled floating-tap DFE architecture with 6 fixed taps, 4 floating taps taking positions up to 38T but having a first tap unrolled and not fed back.

FIG. 9 shows a fourth exemplary embodiment of the present invention having a phase pruning, down-sampled floating-tap DFE architecture with 6 fixed taps, 4 floating taps taking positions up to 38T but having a first tap unrolled and not fed back. The configuration shown in FIG. 9 is similar to the architecture of FIG. 4, which like elements operating in an analogous manner. However, in FIG. 9, the first latch (tap 202(1)) is augmented by a second latch 904, each of which receives the first tap weight b(1), and the latches are each clocked at the higher rate clkT. The output of these two latches 202(1) and 904 is selected through MUX 902 based on the output of the second latch (tap 202(2)) and fed to the remaining ones of the 6 fixed taps 202. Such configuration might be beneficial for some implementations with respect to timing constraints.

Figure 10:
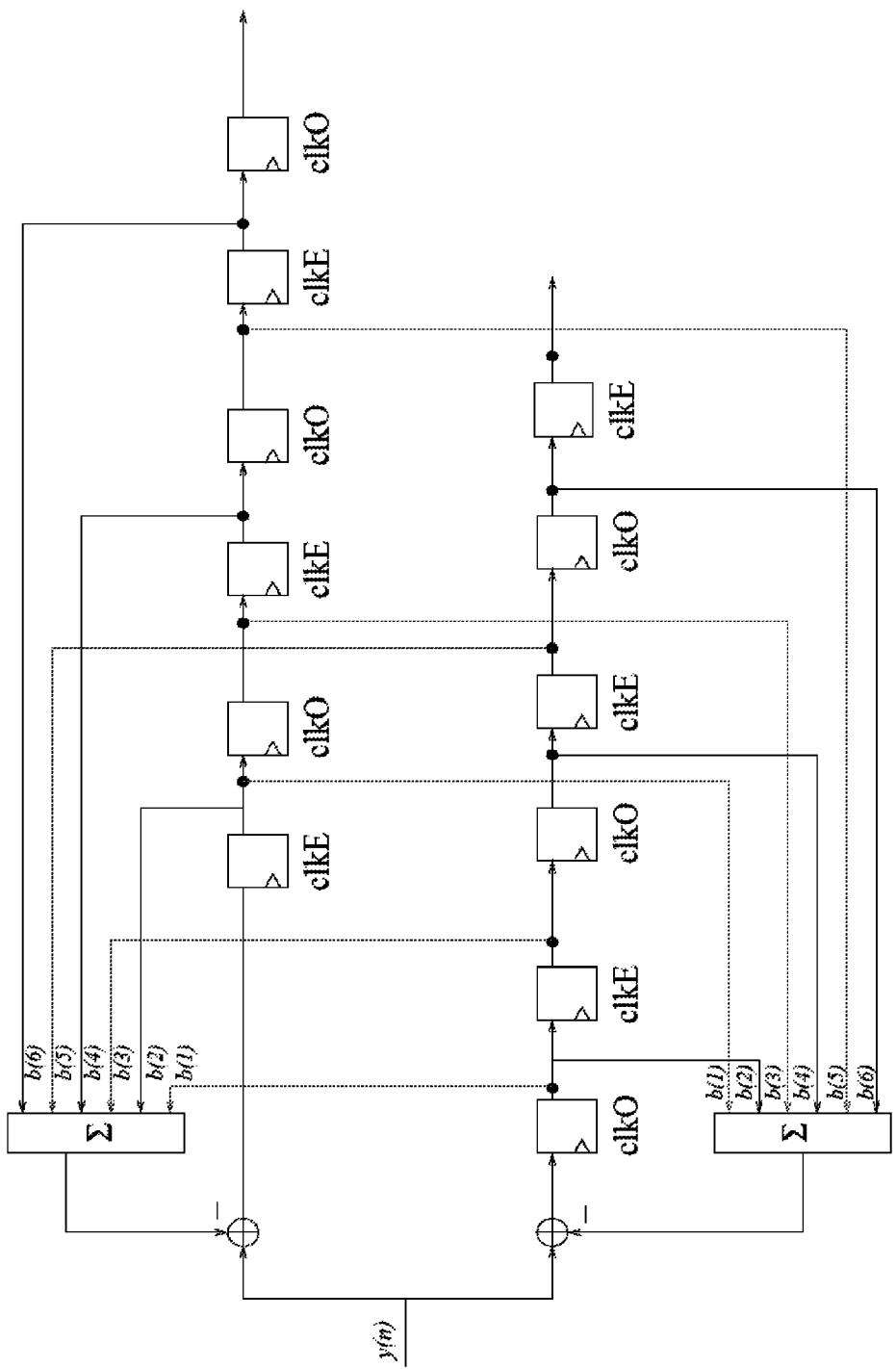
FIG. 10 shows an exemplary 2T-based feedback DFE architecture with 6 fixed taps.

FIG. 10 shows an embodiment of DFE having a 2T-based feedback DFE architecture with 6 fixed taps. Some implementations based on the configuration of FIG. 10 might double the hardware and operate components at a lower speed of 2T. The configuration of FIG. 10 employs latches clocked at the even (clkE) and odd (clkO) transitions, providing the 2T timing.

Figure 11:
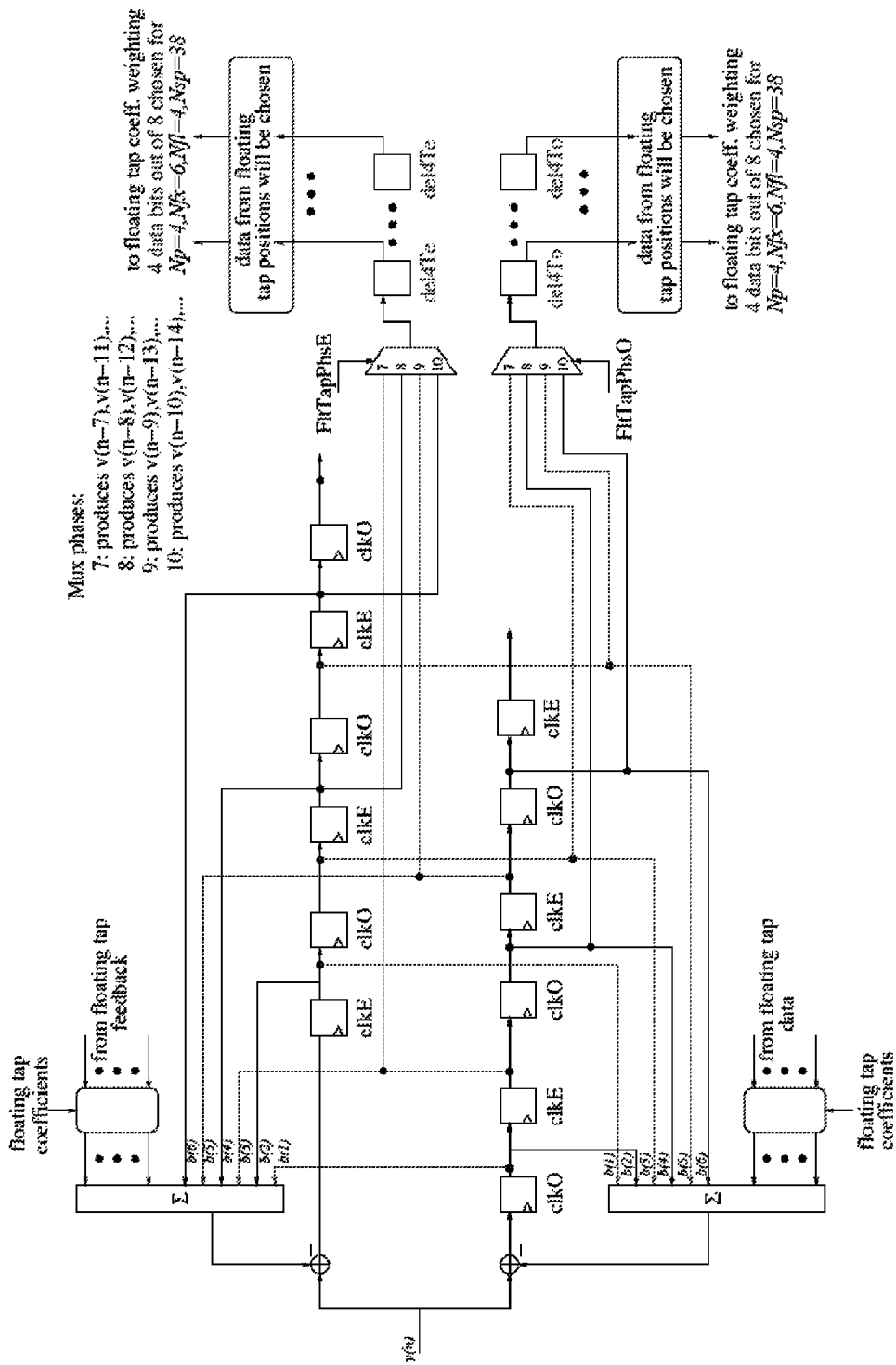
FIG. 11 shows a sixth exemplary embodiment of the present invention having a phase pruning down-sampled floating-tap DFE architecture with 6 fixed taps, 4 floating taps taking positions up to 38T incorporating analog delays.

FIG. 11 shows a fifth exemplary embodiment of the present invention having a phase pruning down-sampled floating-tap DFE architecture with 6 fixed taps, 4 floating taps taking positions up to 38T and having a 2T-based architecture. Consequently, the sixth exemplary embodiment might be considered a combination of a downsampled phase pruning DFE employing a 2T architecture of FIG. 10.

Figure 12:
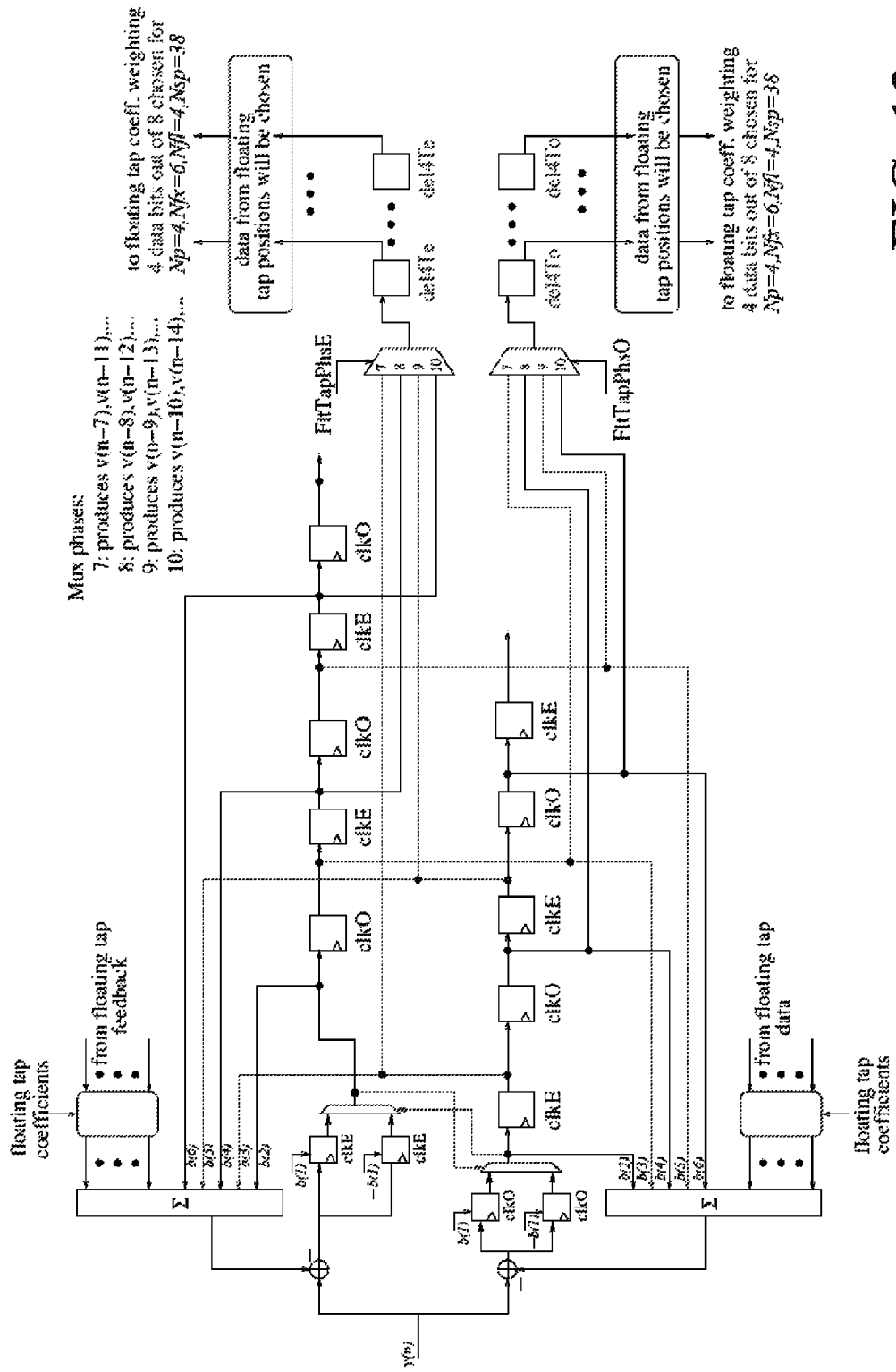
FIG. 12 shows a fifth exemplary embodiment of the present invention having a phase pruning down-sampled floating-tap DFE architecture with 6 fixed taps, 4 floating taps taking positions up to 38T and having a 2T-based architecture with its first tap unrolled.

FIG. 12 shows a sixth exemplary embodiment of the present invention having a phase pruning down-sampled floating-tap DFE architecture with 6 fixed taps, 4 floating taps taking positions up to 38T and having a 2T-based architecture and with its first tap unrolled. Consequently, the sixth exemplary embodiment might be considered a combination of a downsampled phase pruning DFE employing a 2T architecture of FIG. 10 with an unrolled first tap as in the embodiment shown in FIG. 9.

Phase amalgamation might also be employed with architectures using 1 or more tap unrolling and 2T implementations and combinations thereof. The exemplary embodiments have been described herein with specific parameters Nfx=6, Nfl=4, Nsp=38, and Np=4; however, one skilled in the art might readily extend the teachings herein to configurations incorporating other values for these specific parameters, and the techniques described herein generalized to other extensions of the various implementations, such as 2 tap unrolling or a 4T based fixed tap architecture.

Figure 13:
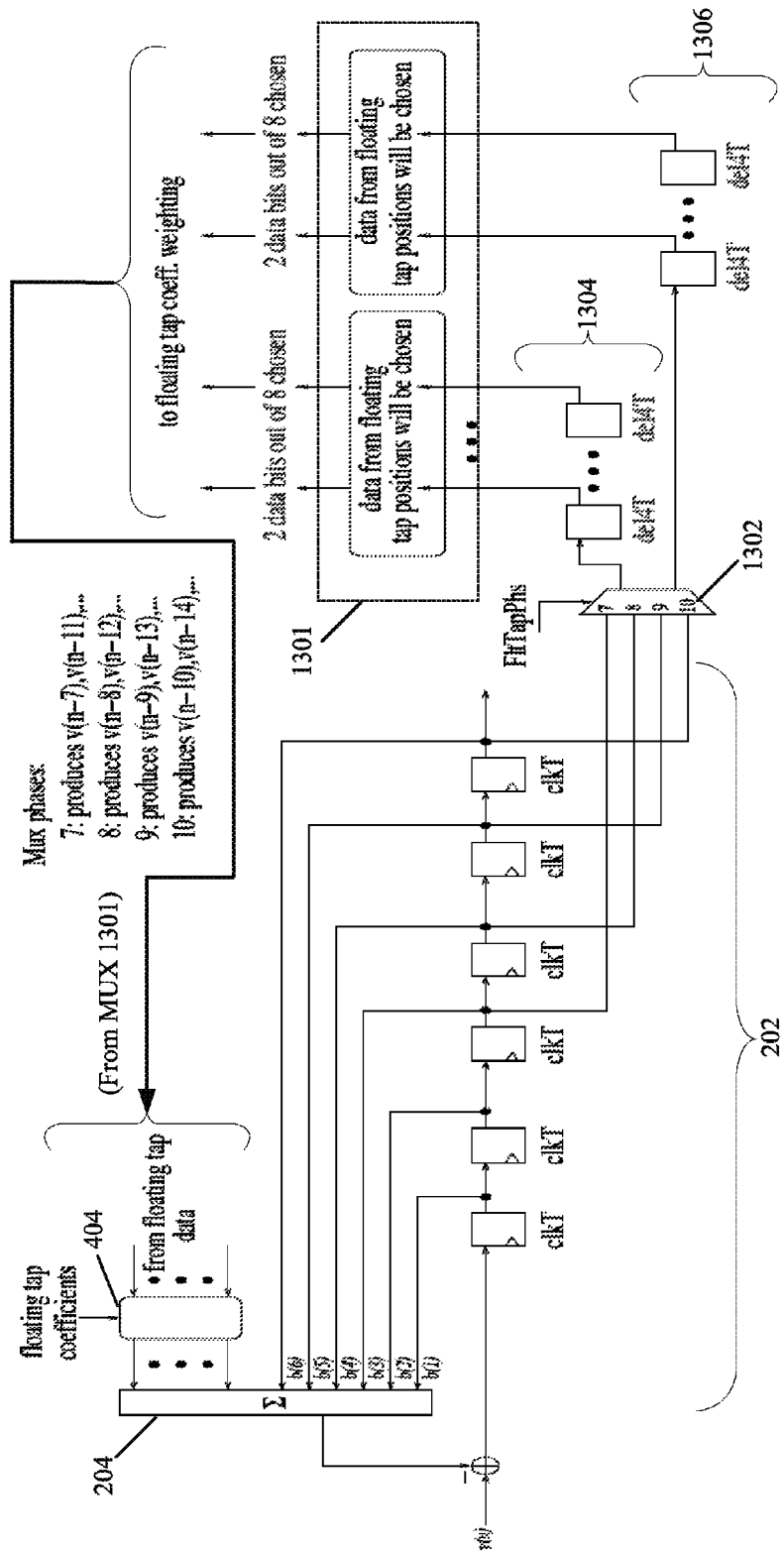
FIG. 13 shows an seventh exemplary embodiment of the present invention having prulgamation down-sampled floating-tap DFE architecture with 6 fixed taps, 4 floating taps taking positions up to 38T.

FIG. 13 shows an seventh exemplary embodiment of the present invention having prulgamation down-sampled, floating-tap DFE architecture with 6 fixed taps, 4 floating taps taking positions up to 38T. Instead of pruning to one phase or amalgamating 4 phases, the 'prulgamation' (short for pruning-amalgamation) architecture of FIG. 13 is a hybrid architecture with fixed taps 202, floating tap groups 1304 and 1306, for which selected tap outputs are weighted in 404 and combined with weighted, fixed-tap outputs in summer 204.

For the implementation of FIG. 13, the 4 possible phases are pruned to two phases through use of MUX 1302 under control of FltTapPhs into the two floating-tap groups 1304 and 1306, with 2 floating taps selected across each of the two phases, and then amalgamating the results of these 2 phases to obtain the final set of 4 floating tap positions. MUX 1302 is employed to cycle between the 4 phases and record the best two tap positions in each phase. The method employed is similar to that described above with reference to the exemplary method of FIG. 5. With reference to the exemplary method of FIG. 5, for the floating tap selection of steps 501 through 504, the two best (maximum tap magnitude) positions out of the 8 possible choices are determined. However, step 505 is modified so that, instead of pruning to one phase, pruning is performed to the best two phases yielding overall highest sum of tap magnitudes. The method selects the best two phases from 6 possible choices of pairs of best phases. For the exemplary implementations herein employing 4 phases 7, 8, 9, 10, the six possible choices are (7, 8), (7, 9), (7, 10), (8, 9), (8, 10), (9, 10). Finally, step 506 is modified so as to amalgamate the taps across the two best phases to arrive at the overall 4 floating tap positions.

Pruning provides the relative lowest complexity implementation, amalgamation provides the relative highest complexity implementation, and prulgamation provides an implementation with complexity in between pruning and amalgamation. One skilled in the art might extend the teachings herein to '2T' or 'unrolled' versions of the prulgamation architecture shown in FIG. 13.

In addition, the number of multiplexors (MUXs) employed does not necessarily correspond to number of phases. For the described embodiments, in all cases the down-sampling factor is illustrated as 4 but for those implementations with pruning an initial 4 to 1 multiplexor is followed by only 1 other (8 to 4) multiplexor. However, for amalgamation, 4 multiplexors (8 to 1s) are employed, and for prulgamation a (4 to 2) multiplexor is employed, followed by two (8 to 2) multiplexors. Consequently, each implementation employs multiplexing logic for best phase selection, wherein the multiplexing logic is arranged in a hierarchy of differing levels. For amalgamation, a set of multiplexors is employed at a single level to select the best phases across all floating taps, whereas for pruning at least one first level multiplexer is employed to select phases from the fixed taps, and at least one second level multiplexor is employed to select the final best phases from the floating taps. Prulgamation employs multiplexing that simply combines both amalgamation and pruning multiplexing hierarchies.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments of the present invention have been described with respect to processes of circuits, including possible implementation as a single integrated circuit, a multi-chip module, a single card, or a multi-card circuit pack, the present invention is not so limited. As would be apparent to one skilled in the art, various functions of circuit elements may also be implemented as processing blocks in a software program. Such software may be employed in, for example, a digital signal processor, micro-controller, or general purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

It will be further understood that various changes in the details, materials, and arrangements of the parts which have been described and illustrated in order to explain the nature of this invention may be made by those skilled in the art without departing from the scope of the invention as expressed in the following claims.

We claim:

1. An apparatus for applying decision feedback equalization to an input signal, comprising:
    a set of delays configured to receive the input signal, the set of delays comprising a fixed-tap group and a floating tap group, wherein delays of the fixed-tap group are coupled in series, wherein each delay holds a detected symbol of the input signal with a period based on the symbol period;
    multiplexing logic configured to couple predetermined outputs of the set of delays of the fixed tap group to selected ones of tile floating tap group and provide the output values of the selected ones of the floating tap group based on a relative best phase criteria to provide at least one of phase pruning and phase amalgamation;
    a combiner configured to i) adjust an output value of one or more of the fixed-tap group and the output values of the selected ones of the floating tap group by a corresponding tap-weight coefficient and ii) combine the tap-weight coefficient adjusted values into an output signal,
    wherein the output signal of the combiner is subtracted from the input signal, and
    wherein the multiplexing logic comprises a first multiplexor and a second multiplexor, thereby providing the phase pruning, wherein:
        the first multiplexor is configured to select different phases of the signal passing though the fixed-tap group, thereby selecting a subset of phases of the input signal for the floating-tap group; and
        the second multiplexor is configured to prune the subset of phases of the input signal for the floating-tap group to provide the selected ones of the floating lap group based on the relative best phase criteria.

2. The apparatus of claim 1, wherein each delay of the set of delays is selected as at least one of an analog delay and a latch.

3. The apparatus of claim 2, wherein each delay of the fixed-tap group is a latch clocked at the symbol period.

4. The apparatus of claim 2, wherein, for the fixed-tap group, at least one delay of the fixed-tap group is unrolled.

5. The apparatus of claim 1, wherein each delay of the floating-tap group is substantially based on the down-sampled symbol period less or more a zero or non-zero fractional portion thereof.

6. The apparatus of claim 1, wherein the multiplexing logic comprises a set of multiplexers arranged in a hierarchy of levels, wherein:
    the delays of the floating-tap group are coupled to the output of at least one selected delay of the fixed-tap group;
    each multiplexor at a level is coupled to a sub-set of outputs of the delays of the floating tap group, the outputs of the delays associated with each sub-set separated, in phase, by a value based N, N a positive integer based on a down-sampled symbol period; and
    each multiplexor at a level selects one of the corresponding sub-set of outputs based on the relative best phase criteria to provide the output values of the selected ones of the floating tap group.

7. The apparatus of claim 6, wherein each delay of the floating-tap group is timed based on at least one of the symbol period, an integer multiple of the symbol period, and a non-integer multiple of the symbol period.

8. The apparatus of claim 6, wherein the hierarchy of levels includes one level, thereby providing the phase amalgamation, the delays of the floating-tap group are coupled in series and an input of tile first delay of the floating, tap group is coupled to an output of a selected one delay of the fixed-tap group.

9. The apparatus of claim 6, wherein the hierarchy of levels includes at least two levels, thereby providing the phase pruning, each first level multiplexor configured to receive selected output phases of the fixed-tap group and provide the selected output phases of the fixed-tap group to corresponding sets of delays of the floating-tap group coupled in series, and each second level multiplexor configured to receive selected output phases of corresponding sets of delays of the floating-tap group and provide the selected ones of the floating tap group based on a relative best phase criteria.

10. The apparatus of claim 1, wherein:
    the delays of the fixed-tap group are divided into at least two sets, each set corresponding to either even phases or odd phases of the sampling period,
    the delays of the floating-tap group are divided into an even-phase floating tap group and an odd-phase floating tap group, the delays of the even-phase floating tap group are coupled in series and the delays of the odd-phase floating tap group are coupled in series to the output of at least one selected delay of the fixed-tap group,
    the multiplexing logic couples predetermined outputs of each even phase set of delays of the Fixed-tap group to corresponding ones of the even-phase floating tap group and couples predetermined outputs of each odd phase set of delays of the fixed-tap group to corresponding ones of the odd-phase floating tap group; and
    the multiplexing logic selects one or more outputs of delays of the even-phase floating tap group and one or more outputs of delays of the odd-phase floating tap group based on a relative best phase criteria to provide the output values of the selected ones of the floating tap group.

11. The apparatus of claim 1, wherein the apparatus is embodied in a Serializer-Deserializer (SerDes) device.

12. A method of applying decision feedback equalization to a signal, the method comprising:
    receiving the signal by a set of delays, the set of delays comprising a fixed-tap group and a floating tap group, wherein delays of the fixed-tap group are coupled in series, wherein each delay holds a detected symbol of the input signal with a period based on the symbol period;

coupling, with multiplexing logic, predetermined outputs of the set of delays of the fixed-tap group to selected ones of the floating tap group;

providing, by the multiplexing logic, the output values of the selected ones of the floating tap group based on a relative best phase criteria to provide at least one of phase pruning and phase amalgamation;

adjusting an output value of one or more of the fixed-tap group and the output values of the selected ones of the floating tap group by a corresponding tap-weight coefficient;

combining, with a combiner, the tap-weight coefficient adjusted values into an output signal; and subtracting the output signal of the combiner from the input signal, wherein the multiplexing logic comprises a first multiplexor and a second multiplexor thereby providing the phase pruning, and wherein:

down-sampling, with the first multiplexor, the input signal passing though the fixed-tap group, thereby selecting different phases as a subset of phases of the input signal for the floating-tap group; and pruning, with the second multiplexor, the subset of phases of the input signal for the floating-tap group to provide the selected ones of the floating tap group based on the relative best phase criteria.

13. The method. of claim 12, wherein, for the receiving the signal by a set of delays, for the fixed-tap group, at least one delay of the fixed-tap group is unrolled.

14. The method of claim 12, comprising timing each delay of the floating-tap group based on the downsampled symbol period.

15. The method of claim 12, wherein the multiplexing logic comprises a set of multiplexers arranged in a hierarchy of levels, and comprising:

coupling the delays of the floating-tap group to the output of at least one selected delay of the fixed-tap group;

coupling each multiplexor at a level to a sub-set of outputs of the delays of the floating tap group, the outputs of the delays associated with each sub-set separated, in phase, by a value based on N, N a positive integer based on a down-sampled symbol period; and selecting, by each multiplexor at a level, one of the corresponding sub-set of outputs based all the relative best phase criteria, thereby providing the output values of the selected ones of the floating tap group.

16. The method of claim 15, comprising timing each delay of the floating-tap group based on at least one of the symbol period, an integer multiple of the symbol period, and a non-integer multiple of the symbol period.

17. The method of claim 15, the hierarchy of levels includes one level, thereby providing the phase amalgamation, comprising coupling the delays of the floating-tap group in series and coupling an input of the first delay of the floating tap group to an output of a selected one delay of the fixed-tap group.

18. The method. of claim 15, wherein the hierarchy of levels includes at least two levels, thereby providing the phase pruning, comprising:

receiving, by each first level multiplexor, selected output phases of the fixed-tap group and providing the selected output phases of the fixed-tap group to corresponding sets of delays of the floating tap group coupled in series; and receiving, by each second level multiplexor selected output phases of corresponding sets of delays of the floating-tap group and provide the selected ones of the floating tap group based on a relative best phase criteria.

19. The method of claim 12, wherein the multiplexing logic comprises a first multiplexor and a second multiplexor, thereby providing phase amalgamation, and, wherein:

down-sampling, with the first multiplexor, the input signal passing though the fixed-tap group, thereby selecting different phases as at least two subsets of phases of the input signal for the floating-tap group into at least two sections, each section providing the phase amalgamation; and pruning, with the second multiplexor, the subset of phases of the input signal in each section for the floating-tap group to provide the selected ones of the floating tap group based on the relative best phase criteria, thereby providing the phase pruning.

20. The method of claim 12, comprising:

dividing the delays of the fixed-tap group into at least two sets, each set corresponding to either even phases or odd phases of the sampling period, dividing the delays of the floating-tap group into an even-phase floating tap group and an odd-phase floating tap group, the delays of the even-phase floating tap group coupled in series and the delays of the odd-phase floating tap group coupled in series to the output of at least one selected delay of the fixed-tap group, coupling, by the multiplexing logic, predetermined outputs of each even phase set of delays of the fixed-tap group to corresponding ones of the even-phase floating tap group, and coupling predetermined outputs of each odd phase set of delays of the fixed-tap group to corresponding ones of the odd-phase floating tap group; and selecting, by the multiplexing logic, one or more outputs of delays of the even-phase floating tap group and one or more outputs of delays of the odd-phase floating tap group based on a relative best phase criteria, thereby providing the output values of the selected ones of the floating tap group.

21. A non-transitory machine-readable storage medium, having encoded thereon program code, wherein, when the program code is executed by a machine, the machine implements a method for applying decision feedback equalization to a signal, the method comprising the steps of:

receiving the signal by a set of delays, the set of delays comprising a fixed-tap group and a floating tap group, wherein delays of the fixed-tap group are coupled in series, wherein each delay holds a detected symbol of the input signal with a period based on the symbol period;

coupling, with multiplexing logic, predetermined outputs of the set of delays of the fixed-tap group to selected ones of the floating tap group;

providing, by the multiplexing logic, the output values of the selected ones of the floating tap group based on a relative best phase criteria to provide at least one of phase pruning and phase amalgamation;

adjusting an output value of one or more of the fixed-tap group and the output values of the selected ones of the floating tap group by a corresponding tap-weight coefficient;

combining, with a combiner, the tap-weight coefficient adjusted values into an output signal; and subtracting the output signal of the combiner from the input signal, wherein the multiplexing logic comprises a first multiplexor and a second multiplexor, thereby providing the phase pruning, and wherein:

down-sampling, with the first multiplexor, the input signal passing though the fixed-tap group, thereby selecting different phases as a subset of phases of the input signal for the floating-tap group; and pruning with the second multiplexor, the subset of phases of the input signal for the floating-tap group to provide the selected ones of the floating tap group based on the relative best phase criteria.

\* \* \* \* \*